United States Patent [19]

Wille et al.

[11] Patent Number: 5,638,432
[45] Date of Patent: Jun. 10, 1997

[54] METHOD OF SETTING UP TELECOMMUNICATION CONNECTIONS

[75] Inventors: Klaus Wille; Georg Jahnke; Eberhard Wildgrube, all of Munich; Maung Myo-Kyaw, Stockdorf, all of Germany

[73] Assignee: Siemens Aktiengesellschaft, Munich, Germany

[21] Appl. No.: 426,432

[22] Filed: Apr. 20, 1995

Related U.S. Application Data

[63] Continuation of Ser. No. 277,131, Jul. 19, 1994, which is a continuation of Ser. No. 903,252, Jun. 23, 1992.

[51] Int. Cl.$^6$ .............................................. H04M 15/00
[52] U.S. Cl. ...................... 379/121; 379/112; 379/113; 379/114; 379/133; 379/134
[58] Field of Search ..................... 379/112, 114, 379/121, 201, 209, 212, 213, 111, 113, 115, 133, 134

[56] References Cited

U.S. PATENT DOCUMENTS

| | | | |
|---|---|---|---|
| 3,728,486 | 4/1973 | Kraus | 179/2 |
| 3,867,582 | 2/1975 | Weed et al. | 179/18 |
| 4,022,983 | 5/1977 | Braun et al. | 379/209 |
| 4,086,438 | 4/1978 | Kahn et al. | 179/18 |
| 4,166,929 | 9/1979 | Sheinbein | 379/209 |
| 4,264,956 | 4/1981 | Delaney | 379/112 |
| 4,488,004 | 12/1984 | Bogart et al. | 379/225 |
| 4,661,974 | 4/1987 | Bales et al. | 379/225 |
| 4,696,028 | 9/1987 | Morganstein | 379/213 |
| 4,768,223 | 8/1988 | Kinoshita et al. | 379/155 |
| 4,811,382 | 3/1989 | Sleevi | 379/202 |
| 4,813,070 | 3/1989 | Humphreys et al. | 379/212 |
| 4,899,374 | 2/1990 | Van Landeghem | 379/209 |
| 4,935,956 | 6/1990 | Hellwarth et al. | 379/144 |
| 4,969,185 | 11/1990 | Dorst et al. | 379/209 |
| 5,008,886 | 4/1991 | Yazawa et al. | 379/93 |
| 5,029,196 | 7/1991 | Morganstein | 379/210 |
| 5,268,957 | 12/1993 | Albrecht | 379/209 |

FOREIGN PATENT DOCUMENTS

| | | |
|---|---|---|
| 2134125 | 7/1970 | Germany . |
| 036619 | 9/1981 | Germany . |
| 3330376 | 8/1983 | Germany . |
| 3512788 | 4/1985 | Germany . |

OTHER PUBLICATIONS

Patent abstracts of Japan vol. 11, No. 20 (E-472)2467) 20, Jan. 1987 & JP-A-61 189 759 (NEC Eng Ltd) 23, Aug. 1986.
VMX User's Guide.
HICOM 600 System Product Data, pp. 53/54.
ISDN in the Office, pp. 56 to 64.

*Primary Examiner*—Curtis Kuntz
*Assistant Examiner*—Vijay Shankar

[57] ABSTRACT

Method for establishing a telecommunication connection wherein a calling party at a first telecommunication terminal station external to a private branch exchange (PBX) sets up a first connection to the PBX via a public telecommunication network and transmits information to the PBX which indicates, inter alia, a telephone number of a second telecommunication terminal station. In response, the PBX sets up a telecommunication connection between the first telecommunication terminal station and the second terminal station and, in addition, the PBX stores information relating to call charges resulting from the connection to the second terminal station.

15 Claims, 8 Drawing Sheets

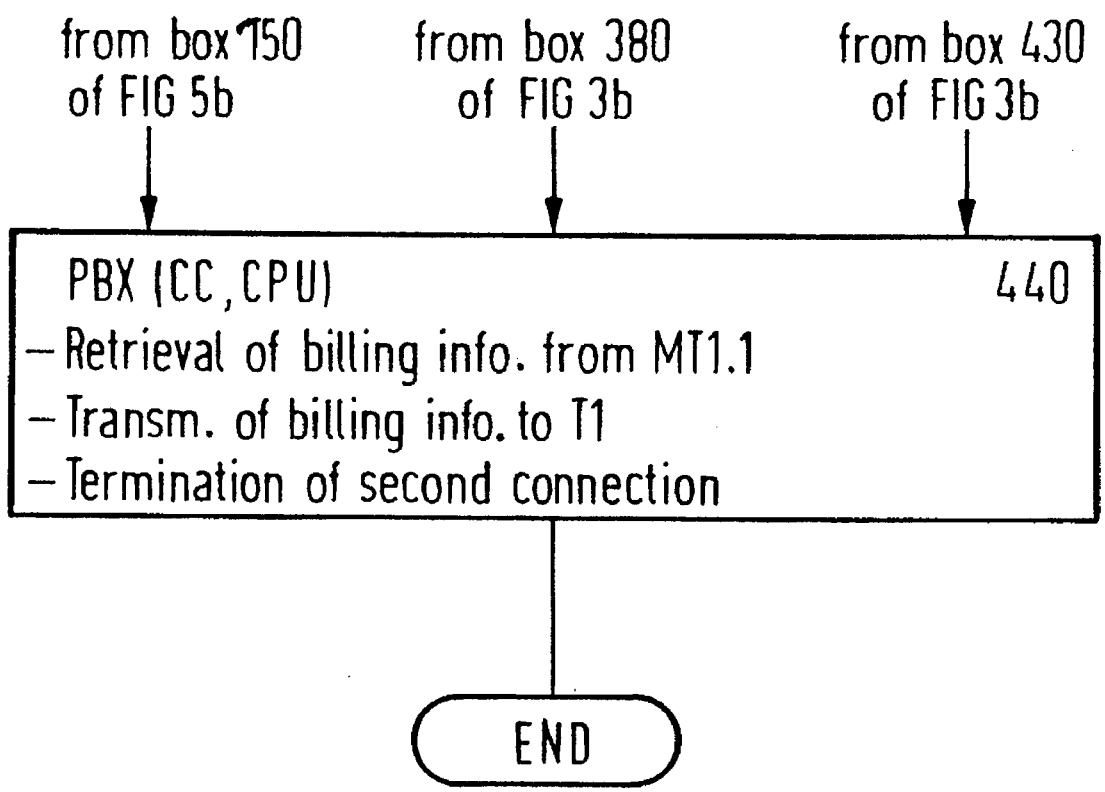

METHOD OF SETTING UP TELECOMMUNICATION CONNECTIONS

CROSS-REFERENCE TO RELATED APPLICATION

This is a continuation of Ser. No. 08/277,131 filed Jul. 19, 1994, which is a continuation of Ser. No. 07/903,252 filed on Jun. 23, 1992.

TECHNICAL FIELD OF THE INVENTION

The present invention pertains to a method for establishing a telecommunication connection between telecommunications terminal stations utilizing a private branch exchange (PBX) wherein the calling party's terminal station is external to the PBX.

BACKGROUND OF THE INVENTION

U.S. Pat. No. 4,652,700 (the '700 patent) discloses a communication system having a centralized storage. As shown in the '700 patent, voice communications may be stored in the centralized storage means, which voice communications are subsequently transmitted to specifically predetermined terminal stations. In this regard, such a function called "future delivery" which utilizes a communication system having a centralized storage is already known in the prior art from a publication by VMX, Inc., of the U.S., namely the "VMX User's Guide." In accordance with this "future delivery" function, a telephone subscriber, for example, subscriber A, can store a communication in the centralized storage of the communication system, which communication is intended for delivery to another telephone subscriber, for example, subscriber B. Further, in accordance with this "future delivery" function, the communication is delivered to subscriber B at a later or future point in time. The function of transmitting the communication at a future point in time can result in substantial costs. This is especially true whenever the communication from the centralized storage of the communication system takes place via the public switched network to terminal stations which are far from the communication system.

German Patent Disclosure DE 33 30 376 A1 and European Patent Application EP 0 380 190, disclose a method for storing call data generated during call charging at telephone exchanges and, especially private branch exchanges, as well as a procedure called "automatic generation of billing records." These prior art methods serve to record charges for telephone connections that are initiated by users of respective telephone exchanges.

U.S. Pat. No. 3,867,582 discloses a configuration of private branch exchanges known as "remote control for private automatic branch exchanges." As disclosed in this patent, external terminals can avail themselves of services offered by the private branch exchanges as if they were internal terminals. As a consequence of this, costs are reduced for external terminals, which costs would occur in conjunction with connection which would otherwise be set up by interconnecting an exchange (operator) or by using credit cards.

U.S. Pat. No. 3,728,486 discloses a "voicegram service" wherein a central exchange, a voicegram service center, initiates recording of voice messages from a send-side station; transmits voice messages to a receive-side station at a predetermined time; and bills the charges for this service to the send-side station.

Despite the above-described services which are available in the art such as, for example, "future delivery" of communications; storing call charging data at telephone exchanges such as private business exchanges; remote control; and voicegram, there is a need in the art for a method which provides users of telecommunication terminal stations which are external to a private business exchange the ability to utilize the capabilities of such private branch exchanges.

SUMMARY OF THE INVENTION

Embodiments of the present invention solve the above-identified need in the art by providing a method for calling parties which are external to a private business exchange (PBX), i.e., which are not associated with the PBX, to utilize the PBX as a means for providing a connection to a called party. As such, in accordance with the present invention, users of external telecommunication terminal stations, as calling parties, utilize specific private branch exchanges (PBXs) with which they are not associated as means for providing a connection to a called party, i.e., the specific PBXs act as relay stations. Advantageously, in accordance with the inventive method, costs arising in such a connection are charged to the specific calling party. This provides an additional advantage to the operator of the relay PBXs in that costs incurred in the call can be billed in a simple manner to the respective calling party users. In accordance with the present invention, a called party may utilize a terminal station which is internal to the PBX or one that is external to the PBX.

In accordance with a first aspect of the present invention, a connection can be established between: (a) a calling party utilizing a telecommunication terminal station that is not associated with, i.e., is "external" to, a PBX and (b) any telecommunication terminal station to which the PBX can set up a connection. As one can readily appreciate from this, worldwide connections can be made between the calling party utilizing a telecommunication terminal station which can reach the PBX and any called party utilizing a telecommunication terminal station which can be reached by the PBX. In accordance with this first aspect of the present invention, after the calling party transmits the calling number of the desired called party, the connection between the calling party and the PBX is terminated. Then, the PBX attempts to make a connection to the called party. If this connection is successful, a connection is made from the PBX to the calling party and, finally, the calling party and the called party are connected. Advantageously, lower costs are incurred in such a service whenever charges incurred between the PBX and the called party are lower than those incurred between the PBX and the calling party. In an alternative to this first aspect of the present method, the PBX first makes a callback to the calling party, the calling party transmits called number data to the PBX, and then the PBX attempts to make a connection to the called party. This is advantageous in that, as will be described below in conjunction with this alternative to the first aspect of the present invention, the calling party is connected directly after the connection is made to the called party or, if the initially requested called party does not answer, the calling party can transmit the calling number of a further called party. As will be described below, this relieves the calling party from having to set up an additional connection to the PBX and the PBX is relieved from having to set up another connection to the calling party to make a connection to the further called party.

In accordance with a second aspect of the present invention, whenever the called party terminates the connection which was made between the calling party and the called party via the PBX in accordance with the first aspect of the present invention, the PBX may provide the calling party with the option to reach another called party. If the calling party elects to reach another called party, the calling party transmits the telephone number of another called party and, in response, the PBX makes the connection to the another called party. Advantageously, in accordance with this second aspect of the present invention, the calling party is relieved of the need to re-establish another connection to the PBX and the PBX is relieved of the need to set up a connection repeatedly to the calling party.

In accordance with a third aspect of the present invention, to prevent the misuse of the ability to make connections to a called party using the PBX as a relay, the calling party will be required to transmit user- and/or terminal-station-specific right-of-access information to the PBX in order to be able to have the PBX make a connection to the called party. Further, in accordance with this third aspect of the present invention, whenever the telecommunication terminal station used by the calling party transmits its own call number when making an outgoing connection, for example, as is done by an ISDN terminal station which automatically transmits same, and whenever the PBX can receive such information, for example, whenever the PBX is an ISDN installation, it is unnecessary for the calling party to supply terminal-station-specific right-of-access information. In this case, the PBX may verify the right of access to the connection service by checking the transmitted terminal station's telephone call number.

In a fourth aspect of the present invention, advantageously the PBX will make an attempt to provide a connection to a called party telecommunication terminal station at a time determined by input received from the calling party through the calling party's telecommunication terminal station. In addition, in accordance with a further aspect of this fourth aspect of the present invention, in the case of an unsuccessful connection attempt and in response to predetermined stored information or in response to corresponding additional information received from the calling party through the calling party's telecommunication terminal station, the PBX will make a number of attempts to set up a connection. As one can readily appreciate, this aspect of the present invention is particularly advantageous when, at the time of the first connection attempt, at least one of the two terminal stations that are to be connected is not ready for connection.

In accordance with a fifth aspect of the present invention, a communication may be sent from a calling party's terminal station to a called party's terminal station, without the calling party's terminal station being included in the telecommunication connection between the PBX and the called party's terminal station.

In accordance with the present invention, charges that apply: (a) to the setting up of a connection between the PBX and the called party's telephone terminal station and (b) to the use of the public telecommunication network, are stored in a storage unit of the PBX which is associated with the calling party and/or with the calling party's terminal station. In this regard, and in accordance with a sixth aspect of the present invention, the PBX, for example, after termination of the connection between the PBX and the called party or whenever a predetermined calling charge amount has been reached, will retrieve stored call charge information from the respective storage unit and transmit to a predetermined external device, for example, an external device associated with the called party or with the called party's telephone terminal station. As a result, settlement of charges for connections that the PBX had set up in response to requests initiated by the calling party's terminal station is facilitated between the operator of the PBX and the called party.

Other features and advantages of the present invention will be apparent from the detailed description below and from the claims.

For a fuller understanding of the present invention, reference should now be made to the following detailed description and to the accompanying drawings.

BRIEF DESCRIPTION OF THE DRAWINGS

For a better understanding of the present invention, reference is made to the following detailed description, considered in conjunction with the accompanying drawings, in which:

FIGS. 3a to 3c show a flow diagram of a first embodiment of the method of the present invention;

DETAILED DESCRIPTION

Figure 1:
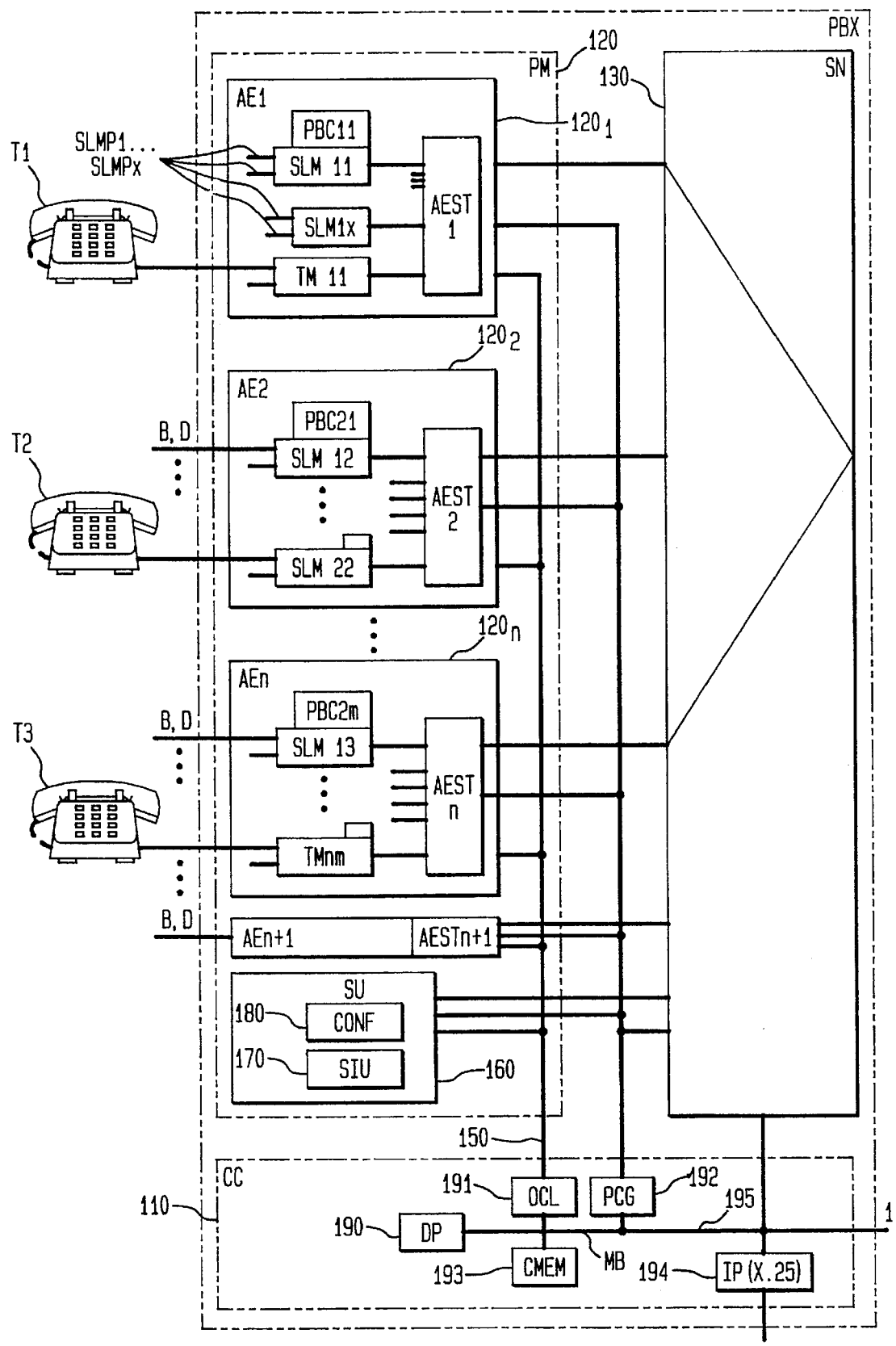
FIG. 1 shows a block diagram of a telecommunication private branch exchange (PBX) which is utilized to carry out the method of the present invention.

FIG. 1 shows a block diagram of relevant portions of telecommunication private branch exchange 100 (PBX 100) which is utilized to carry out the method of the present invention. In particular, PBX 100 shown in FIG. 1 is an ISDN-capable PBX which may be fabricated like the telecommunication system described in a product data sheet of Siemens AG entitled "HICOM 600 System Product Data" Order Number A19100-K3161-G430-01-7600 (Page 33) and "ISDN in the Office," Special Issue of TELCOM Report and Magazine COM, Pages 56 to 64, ISBN 3-8009-3849-9, as well as in the published European patent application EP 0 306 693 A1 (U.S. Pat. No. 4,903,258); EP 0 303 870 A2 (U.S. Pat. No. 5,018,097) and EP 0 303 869 A1 (U.S. Pat. No. 5,047,923). As shown in FIG. 1, PBX 100 is comprised of common control 110 (CC 110), which CC 110 is connected to peripheral module 120 (PM 120) and switching network 130 (SN 130). Further, PM 120 is comprised of peripheral modules $120_1$ to $120_n$ (PM $120_1$ to $120_n$). Still further, as shown in FIG. 1, PM $120_1$ and $120_2$ each comprise subscriber line circuits, for example, PM $120_1$ comprises subscriber line circuits SLM11 . . . SLM1x, for connection with internal terminal stations and PM $120_1$ and PM $120_n$ each comprise trunk circuits, for example, comprises trunk circuit TM11, for connection with terminal stations via the public telecommunication network.

The subscriber line circuits SLM11 . . . are subscriber-oriented terminal-equipment interfaces, which are well known to those of ordinary skill in the art. In particular, such subscriber-oriented terminal equipment interfaces include interfaces such as, for example, ISD base terminals for digital mono- and multi-functional terminal stations, 1-channel terminal module for terminal stations such as digital voice terminal stations and exchange terminal stations, as well as subscriber terminations for analog voice terminal stations. The method of the present invention will advantageously be carried out utilizing terminal stations T1, T2, T3 wherein these terminal stations can be digital or analog voice terminal stations. As shown in FIG. 1, calling party terminal station T1 is an external terminal station, i.e., a terminal station which is connected to PBX 100 by means of a trunk circuit. Hence, as shown in FIG. 1, terminal station T1 is connected to trunk circuit TM11. However, a called party terminal station can be an internal terminal station, i.e., a terminal station which is connected to PBX 100 by means of a subscriber line circuit, or an external terminal station, i.e., a terminal station which is connected to PBX 100 by means of a trunk circuit. Thus, as shown in FIG. 1, terminal station T2 which is connect to subscriber line circuit SLM22 is an internal terminal station and terminal station T3 which is connected to trunk circuit TMnm is an external terminal station. As shown in FIG. 1, subscriber line circuits SLM11 . . . SLM1x are not connected to terminals, they form subscriber line ports SLMP1 . . . SLMP1x which will described below as pseudo-extensions.

As is well known to those of ordinary skill in the art, trunk circuits such as, for example, trunk circuits TM11 and TMnm of FIG. 1, serve to make connection with public and/or private networks or special facilities and are, for example, ISDN base terminals for ISDN public exchange and tie-line traffic (two channels at 64 kbits/s and ISDN signaling) as well as digital interface units, i.e. multiplex terminals (30 channels at 64 kbits/s each), with public exchange and tie-line traffic operating modes and ISDN signaling, or tie-line traffic mode with channel-associated signaling.

Each one of peripheral modules PM $120_1$ to $120_n$ have the same PBX 100 internal system interfaces; they connect the individual base channels B, over which user data information, i.e., voice and/or data information, are transmitted to any desired selection of the two multiplex channels (highways) with for example, 32 channels, of switching network 130 (SN 130), and transmit the signaling information transmitted through a signaling channel D in a HDLC protocol to common control 110 (CC 110).

Each one of peripheral modules $120_1$ to $120_n$ is comprised of a control module: PM $120_1$ is comprised of PBC11; PM $120_2$ is comprised of PBC21; and PM $120_n$ is comprised of PBC2m. The function of the control module is to allocate occupied connecting channels to selected channels of the multiplex channels, if necessary, in conjunction with a control AEST1 to a pertaining line unit AE1 . . . (as described in European patents EP 0 113 884 and EP 0 264 890 and U.S Pat. No. 4,694,452). Several peripheral modules can be functionally connected to a line unit AE. Every line unit AE1, AE2, AEn, AEn+1 is assigned to a control AEST1 . . . and connected with switching network 130 (SN 130), via, for example, four voice, data and multiplex channels in mutual connection, the status-message communication exchange between peripheral modules $120_1$ to $120_n$ and common control 110 (CC 110), takes place via a signaling channel 150 in a well known HDLC point-to-point multipoint process.

As further shown in FIG. 1, service unit 160 (SU 160) is associated with several line units AE1 . . . AEn. SU 160 is comprised of signaling unit 170 (SIU 170) and, optionally, of conference arrangement 180 (CONF 180). SIU 170 provides PBX 100 with call progress tones and possibly with announcements, receives MFV clock pulse selection signals and exchange dial tones. SIU 170 is comprised of, among other things, sound generators which form dialing information and information for activating utility features in accordance with a predetermined multi-frequency process. In doing so, the individual digits and symbols are, for example, formed from two of eight frequencies. In addition, SIU 170 comprises devices for receiving MFV push button codes and exchange dial tones. The manner in which SIU 170 may be fabricated utilizing, for example, signal processors, is well known to those of ordinary skill in the art. Further, signaling unit 170 (SIU 170) is connected to switching network 130 (SN 130) via two voice, data, multiplex channels with fixed function assignment.

Switching network 130 (SN 130) is preferably modular in design and comprises, for example, a non-blocking time stage for 16 voice, data multiplex channels. The coupling of two basic modules of this type results in a switching stage for 1,024 time slots (32 multiplex channels of 32 channels each). The non-blocking time stage formed in this manner connects, of the 32 respective incoming and outgoing multiplex channels for voice or data, any two desired ones of the 32 time slots with one another. In addition to 1-channel connections, broadband connections can also be made.

Control unit 110 (CC 110) performs switching functions that depend on the peripheral design. Further, as shown in FIG. 1, control unit 110 (CC 110) comprises data processor 190 (DP 190), processor 191 (DCL 191) for signaling control, pulse clock generator 192 (PCG 192), storage unit 193 (CMEM 193) and interface processor 194 (IP 194) which is linked to an operating element not shown in FIG. 1. Interface processor 194 can, at the same time, provide a V.24 interface for a workstation, for example, like workstations 510 and 530 (WS 510 and WS 530) shown in FIG. 4 and described in detail below. Storage unit 193 (CMEM 193) is comprised of memory in which specific terminal-station and connection-status information is stored, as well as a data base (not shown) with configuration data. In accordance with the present invention, storage unit 193 (CMEM 193) can record, in a memory allocated to terminal stations such as terminal station T1, calling charges arising from telecommunication connections made to other terminal stations. Alternatively, as will be described below with reference to FIG. 2, separate call charge information stores MT1.1, MT1.2 . . . MT1.n which are assigned to terminal stations T1.1, T1.2 . . . T1.n, respectively, may be arranged in switching module 200 (SM 200) which can be coupled to PBX 100. The aforementioned components DP 190, DCL 191, PCG 192, CMEM 193, and IP 194 are mutually linked via multibus 195 (MB 195) in the manner shown in FIG. 1.

Figure 2:
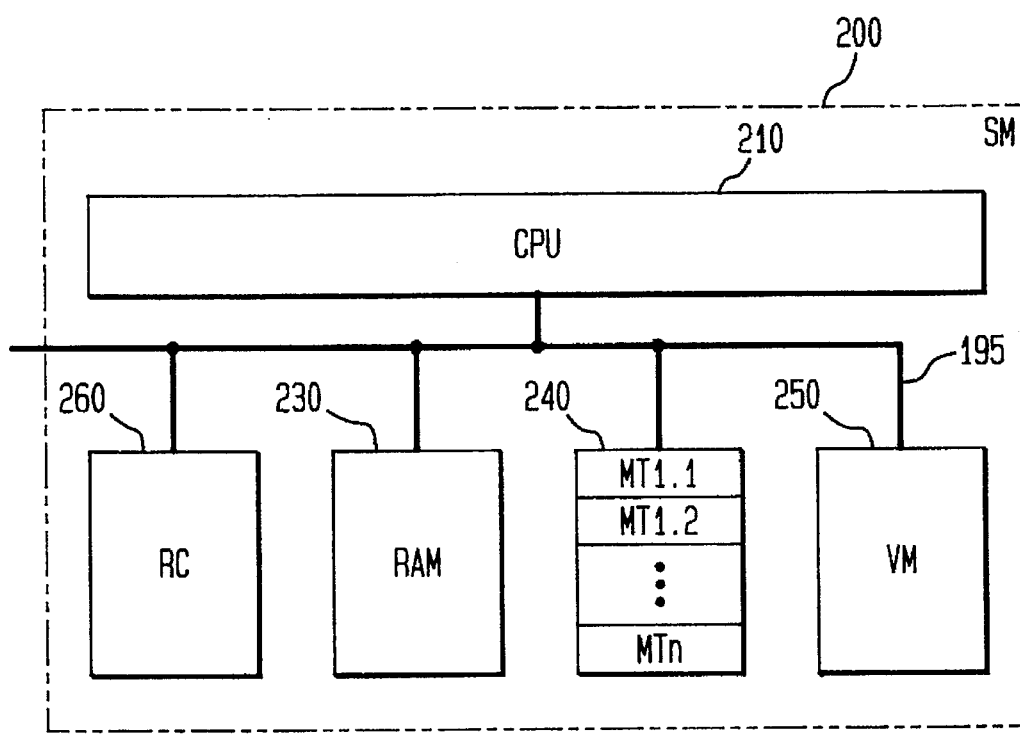
FIG. 2 shows a block diagram of a module which is connected to the PBX of FIG. 1, which module is utilized to carry out the method of the present invention.

In the preferred embodiment, data processor 190 (DP 190) is fabricated utilizing processors of the series SAB8986/ 80286 sold by Siemens AG and storage unit 193 (CMEM 193) is comprised of highly integrated dynamic RAM (DRAM) components and error correction circuits. As will be described below, data processor DP 190 can, in cooperation with controls AEST1 . . . of line units AE1 . . . AEn+1, in addition to the usual communication control processes, also control processes in connection with the method of the present invention. Alternatively, separate control CPU 210 may be utilized, as shown in FIG. 2 and as described below, to control at least a part of the procedures of the inventive method.

Processor 191 (DCL 191) is utilized for signaling control and provides HDLC protocol communication for line units AE1 . . . AEn+1 and for service unit 160 (SU 160). Clock pulse generator 192 (PCG 192) supplies clock pulses for PBX 100 and interface processor 194 (IP 194) establishes connection to integrated servers of PBX 100. For example, as is well known to those of ordinary skill in the art, such integrated servers may include, in particular, voice-mail servers. Thus, in accordance with a preferred embodiment of the present invention, switching module 200 (SM 200) shown in FIG. 2, is provided as an integrated server for PBX 100. As shown in FIG. 2, switching module 200 (SM 200) is comprised of separate control central processing unit 210 (CPU 200) that is connected by means of bus 195 with random access memory 230 (RAM 230) and with call charging information stores MT1.1, MT1.2, ... MT1.n in module 240. RAM 230 contains a software program which is used by control CPU 210. Control CPU 210 relieves control 110 (CC 110) of PBX 100 of some of the burden of carrying out at least a portion of the processes involved in the inventive method. In particular, control CPU 210 carries out processes involved with evaluating additional information transmitted by the calling party from the calling party terminal station as well as processes involved with managing call charging information. Of course, in this regard, SIU 170 may be utilized to interpret additional information that will be transmitted from calling party terminal station T1. Specifically, as will be described in detail below, control CPU 210 determines whether calling party terminal stations or the calling parties have authorized access to the embodiments of the present invention, which determination is made on the basis of the additional information which is received from the calling party terminal. Further, control CPU 210 temporarily stores the telephone number of the called party terminal station to which a connection is to be set up by PBX 100, which information may be stored in one of the segments of calling charge information store 240, for example, the information is stored in one of the segments of MT1.1 when it is assigned to terminal station T1.1.

Control CPU 210 of switching module 200 (SM 200) transmits to control CC 110 of PBX 100 the called number information, for example, the called number information for terminal station T2, together with command data which will cause PBX 100 to set up a connection to the indicated terminal station. Control CPU 210 also administers additional information transmitted from calling party terminal station such as additional information concerning the time and/or the number of connection setup attempts that PBX 100 is to undertake to the respective called party terminal stations.

A calling party terminal station, within the framework of a first connection to PBX 100—apart from transmitting information such as, for example, right-of-access-to-the-service information like user access information and/or terminal station access information; which information is utilized in the manner to be described below to determine whether a particular calling party and/or a particular terminal station may be utilized to access the inventive service— may transmit the time at which PBX 100 is to attempt to make the connection to the second terminal station and/or the number of connection attempts PBX 100 is to make with a second terminal station. In addition, the calling party terminal station may also transmit a communication PBX 100 that is to be transmitted to a second terminal station specified by means of a call number transmitted by the first terminal station. In an embodiment of an inventive method which provides this capability, control CPU 210 stores such communications in store such as, for example, VM 250, temporarily. Later, whenever PBX 100 has set up a connection to the called party terminal station, CPU 210 retrieves the communications from store VM 250 forwards it to control CC 110 for subsequent transmittal to the second terminal station.

Second connections to second terminal stations which go through the public network, at least as far as the part required to connect to terminal station T1, cause costs that are attributed to PBX 100 in the form of call charging information. In particular, PBX 100 receives individual billing information relating to the respective connections from the public exchange concerned (not shown) in a manner which is well known to those of ordinary skill in the art. In accordance one aspect of the present invention, control CC 110 transmits such billing or call charging information relating to the connections provided by the public exchange in accordance with the inventive method to control CPU 210. In response, CPU 210 stores this information on a user-specific or terminal-station-specific basis in corresponding call charge information stores MT1.1, MT1.2, ... MT1.n 240 associated with corresponding calling party terminal stations. Alternatively PBX 100 or switching module SM 200 may automatically generate the call charge information on the basis of available rate information and with the aid of timing member RC 260, a real-time clock. Timing member RC 260 is also utilized to make connections at times specified by information provided from first terminal stations.

PBX 100 can, as described above in conjunction with FIG. 1, have subscriber line circuits SLM11 ... SLM1x to which no terminal stations are connected. As shown in FIG. 1, subscriber line circuits SLM11 ... SLM1x have subscriber line ports SLMP1 ... SLMPx to which a call number is assigned. In accordance with the inventive method, a calling party utilizing terminal station T1 sets up a first communication to a subscriber line port assigned thereto. In response, the calling party receives a signal which indicates that the respective subscriber line port is idle. Then, in response, the calling party or control CC 110 of PBX 100 terminates the connection to terminal station T1. The access by terminal station T1 to the particular subscriber line port causes control CC 110 to access a table (not shown) in which is stored an assignment between the subscriber line port call number and the calling number of the calling party terminal station is stored. Then, control CC 110 cause a second connection, i.e., a recall connection, to be made to the calling party. Then, additional information such as the called party number and, perhaps, information characterizing authorization to utilize the service can be transmitted to PBX 110 and interpreted in cooperation with SIU 170.

Figure 4:
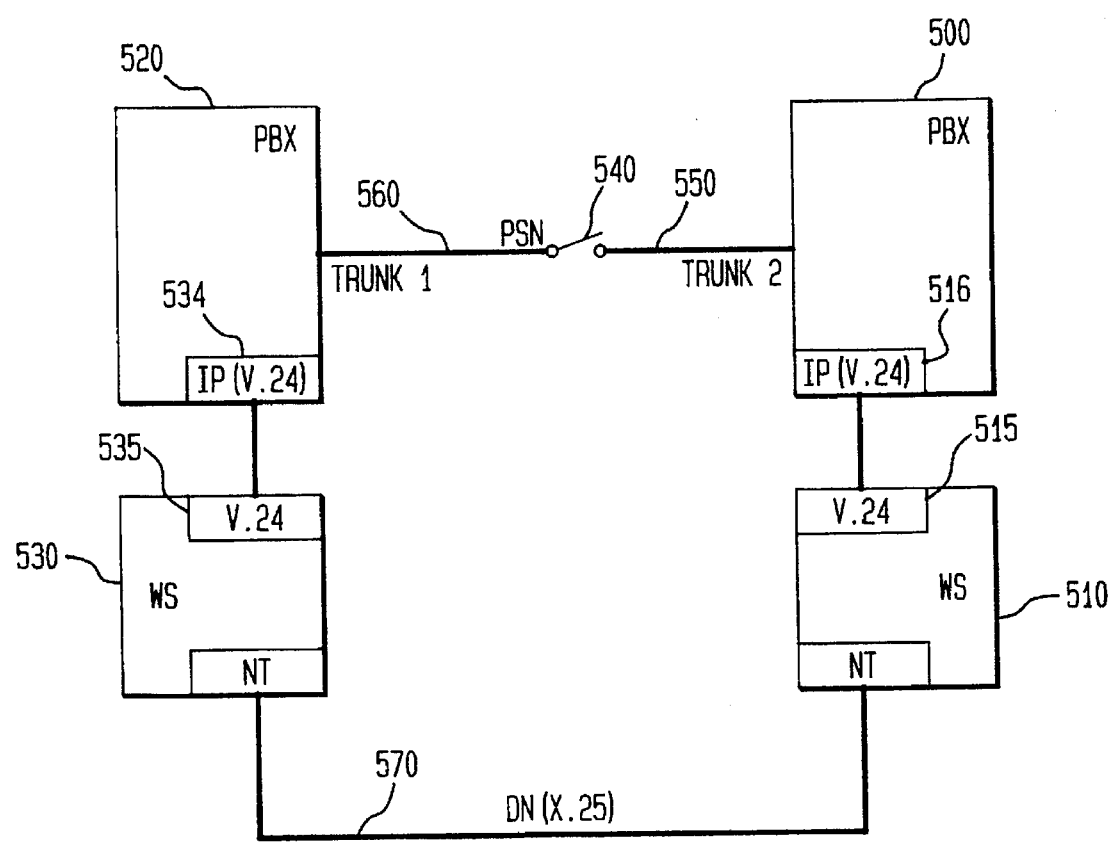
FIG. 4 shows, in pictorial form, a configuration of two private branch exchanges like that shown in FIG. 1 which are connected via a public communication network and a separate public or private data network.

FIG. 4 shows a configuration comprised of private business exchanges PBX 500 and PBX 520. As shown in FIG. 4, PBX 500 is connected to public switching network 540 (PSN 540) by means of exchange trunks 550 and PBX 520 is connected to PSN 540 by means of exchange trunks 560. In addition, as shown in FIG. 4, PBX 500 and PBX 520 are connected to each other by means of a public or private data network 570 (DN 570). Further, PBX 500 is assigned a UNIX workstation WS 510 by means of V.24 interfaces 515 and 516, which workstation forms an interface NT (network termination, for example, ISO interfaces 802.3, 802.4, 802.5) to the public (X.25) or private data network DN 570—similarly for WS 530 and PBX 520. Stations WS 510 and 530 can also be connected to a local area network via an interface which is connected with an Ethernet/X.25 Gateway and PBX 500 and PBX 520 can be integrated into a system described in U.S. Pat. No. 4,313,036. Then, in accordance with the method of the present invention, as shown in FIG. 4, dialing information generated by a calling party terminal station associated with PBX 520 which designates PBX 500 or an internal or external called party terminal station to be called from PBX 500, is transmitted via data network 570 to PBX 500 from PBX 520. In response, PBX 500 can establish a connection to original PBX 520 via PSN 540 in such a manner that calling party terminal station can initiate the connection to the desired called party. Further in accordance with the method of the present invention, PBX 520 can transmit the called party number by treating the transmission of this information as being a portion of the first connection with the calling party via data network DN 570 or PBX 520 can transmit the called party number as being a portion of establishing the second connection to the called party via PSN 540. Thus, in accordance with this embodiment of the inventive method, the first connection is established via the data network 570 while the second, i.e., recall, connection is established via PSN 540. As has been described in conjunction with FIGS. 1 and 2, PBX 500 stores information relating to charges incurred by the use of PSN 540 in a store assigned to calling party terminal T1.

A first embodiment of the method of the present invention will now be described in detail with reference to the flow diagram shown in FIGS. 3a–3c.

Figure 3A:
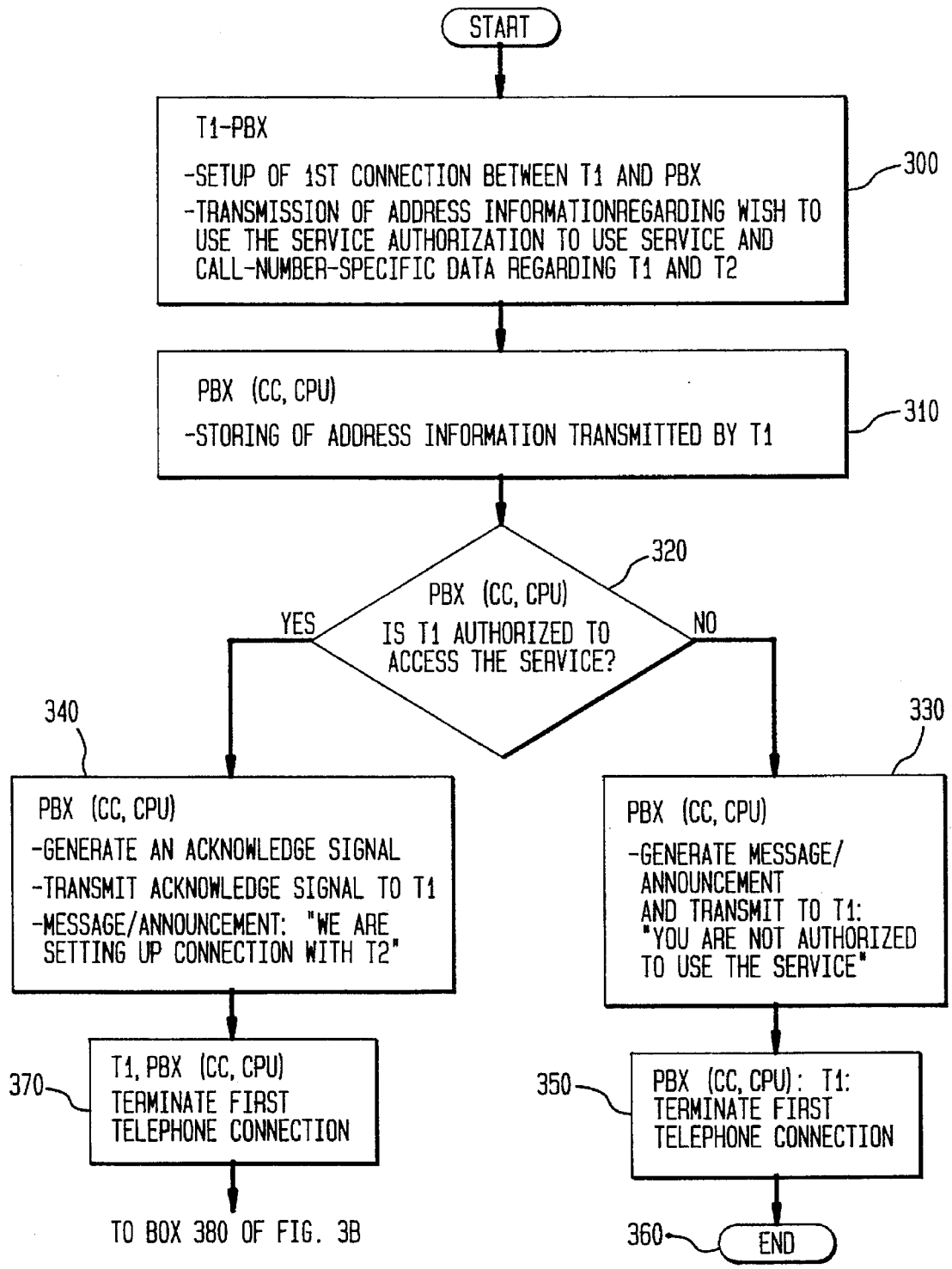

As indicated at box 300 of FIG. 3a, a calling party utilizes external telecommunication terminal station T1 to set up a connection to PBX 100 via a public network (not shown). This is done in a manner which is well known to those of ordinary skill in the art. Then, the calling party transmits additional information to PBX 100 which is utilized in requesting the service provided by embodiments of the present information. The additional information may be transmitted utilizing telecommunication terminal station T1 or it may be transmitted by another device which utilizes the connection set up between T1 and PBX 100. This information may be transmitted in any one of a number of methods which are well known to those of ordinary skill in the art. For example, the calling party can utilize a keypad associated with telecommunications terminal station T1 in the case where T1 is a telephone set. However, those of ordinary skill in the art will readily appreciate that telecommunications terminal station T1 is not restricted to the case where it is a telephone set. For example and without limitation, it is within the spirit of the present invention that telecommunications terminal station be a FAX machine, a computer-driven terminal, and so forth. As such, telecommunications terminal station T1 transmits additional information regarding the calling party's request to use the service provided by the method of the present invention and possibly user-specific or terminal-station-specific information which may be utilized to determine whether this service may be provided to telecommunications terminal station T1 and/or to the particular calling party who is using telecommunications terminal station T1. Further, the additional information includes called party-specific data. For example, such called party-specific data may include information which may utilized by PBX 100 to set up a connection to the called party at, for example, called party telecommunications terminal station T2. It is within the scope of the present invention that this information may identify a called party by, for example and without limitation, telephone number or called party identifier such as name. The additional information is interpreted in cooperation with signaling unit SIU 170. In a first embodiment wherein a second connection must be set up to the calling party terminal T1, calling party terminal T1 transmits its own calling number during the first connection. However, in a system which utilizes ISDN, the calling number is transmitted automatically so that manual input of the calling number digits into terminal station T1 and detection of corresponding voice frequency signals in accordance with a multifrequency process by SIU 170 is not required. Then, after the additional information has been transmitted from telecommunication terminal station T1 to PBX 100, preferably, PBX 100 sends a signal to terminal station T1 which acknowledges receipt of the information. Then, control is transferred to box 310 of FIG. 3a.

As indicated at box 310 of FIG. 3a, PBX 100 temporarily stores the additional information which was transmitted thereto from terminal station T1, which additional information is utilized, among other things, to check the right of the calling party and/or terminal station T1 to use the service provided by the method of the present invention. As indicated in box 310 of FIG. 3a, PBX 100, and in particular control CC 110 and/or control CPU 210, depending on the particular embodiment, perform this storage function. Then, control is transferred to the portion of the method illustrated by decision box 320 of FIG. 3a.

As indicated at decision box 320 of FIG. 3a, PBX 100, and in particular control CC 110 and/or control CPU 210, depending on the particular embodiment, determines whether the calling party and/or terminal station T1 is authorized to use the service provided by the method of the present invention. This determination is made by accessing information stored in CMEM 193 and/or RAM 230, depending on the particular embodiment. Hence, in particular, a determination is made on the basis of the transmitted and, optionally, previously stored additional information, as to whether or not the calling party terminal station T1 and/or the calling party user is authorized to use the service. This check is preferably made as soon as possible during the first connection. The advantage of doing this quickly is that in a case where such a check yields a negative result, for example, where the check shows that the calling party terminal station is not authorized to use the service, PBX 100 can send the calling party terminal station T1, in lieu of an acknowledge signal, a signal and/or other information indicating the negative result of the check. Of course, as those of ordinary skill in the art should readily appreciate, such a negative result may be given later in a manner which will be explained in detail below. As shown in FIG. 3a, if terminal station T1, for example, is authorized to utilize the service, control is transferred to box 340 of FIG. 3a, otherwise, control is transferred to box 330 of FIG. 3a.

As indicated at box 330 of FIG. 3a, PBX 100, and in particular control CC 110 and/or control CPU 210, depending on the particular embodiment, generates a message such as, for example, a message which is used when calling party terminal station T1 is a telephone terminal station, "You are not authorized to use the service" and transmits the message to terminal station T1. The manner in which such a message may be generated and stored in memory such as storage 250 are well known to those of ordinary skill in the art. Those of ordinary skill in the art should readily understand that the present invention is not limited to the situation where terminal station T1 is a telephone terminal station and further includes cases where other types of terminal stations such as facsimile machines, personal computers and so forth are used. In such case, the messages sent are sent in conformity with the well known requirements of the particular systems in a manner which is well known to those of ordinary skill in the art. Then, control is transferred to box 350 and 360 of FIG. 3a whereby the first connection is terminated by PBX 100.

As indicated at box 340 of FIG. 3a, the right-to-access check, within the framework of the first connection, indicates, for example, that T1 is authorized to use the service. Then, PBX 100, and in particular control CC 110 and/or control CPU 210, depending on the particular embodiment, generates an acknowledge signal and, optionally, an informative message which is further transmitted to first terminal station T1 such as, for example, "Please terminate the connection. We are setting up a connection to terminal station T2." Then, in one aspect of the inventive method, terminal station T1 terminates its connection with PBX 100 and control is transferred to the portion of the method illustrated by box 300 of FIG. 3a. In an alternative embodiment, instead of terminal station T1, PBX 100, and in particular control CC 110, terminates the connection between terminal station T1 and PBX 100. Then, control is transferred to box 370 of FIG. 3a.

As indicated at box 370 of FIG. 3a, PBX 100, in response to a signal from control CC 110 and/or control CPU 210, depending on the particular embodiment, terminates the first connection to terminal station T1. Then, control is transferred to box 380 of FIG. 3b.

Figure 3B:
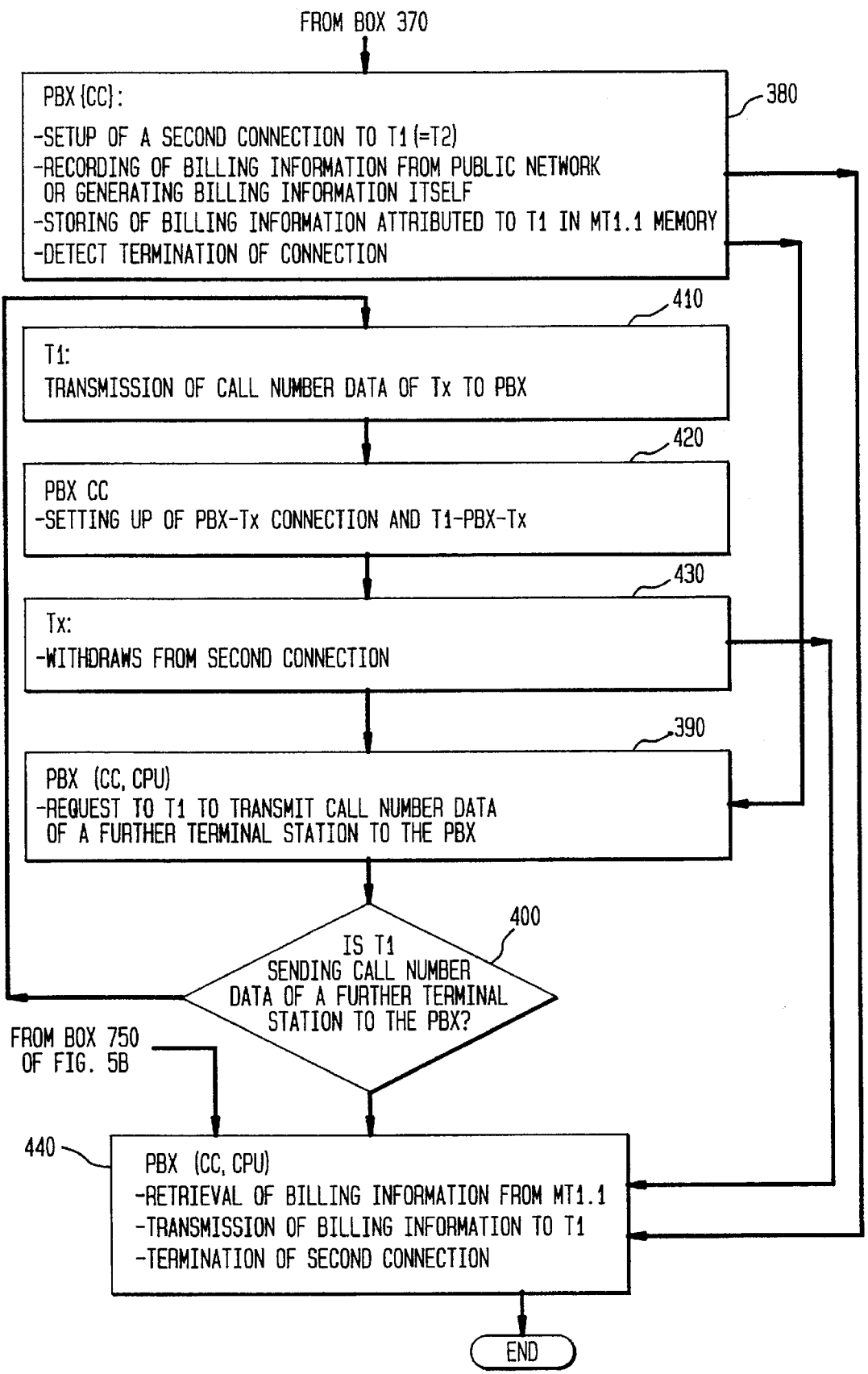

At box 380 of FIG. 3b, PBX 100, by means of control CC 110, sets up a second connection between terminal station T2 and terminal station T1. In accordance with one aspect of the present invention, at the start of the second connection to terminal station T2, PBX 100 begins to register call charging information from a public switching exchange in a manner which is well known to those of ordinary skill in the art or, alternatively, PBX 100 initiates collection of its own billing information. In any event, the billing information is stored, for example, in calling charge information stores MT1.1 that were previously assigned for use by terminal station T1. As those of ordinary skill in the art readily appreciate, the above described a case where the connection between terminal stations T1 and T2 supposed that terminal station T1 and terminal station T2 were compatible, such as, for example, in the case when both are telephone terminal stations. The manner in which alternative types of terminal stations are handled is described later. PBX 100 monitors the connection between T1 and T2 in a manner which is well known to those of ordinary skill in the art. If PBX 100 determines that the call between terminal station T1 and terminal station T2 has ended because, for example, T1 has gone "on-hook," control is transferred to box 440 of FIG. 3c. However, if the call between terminal station T1 and terminal station T2 has ended because T2 has gone "on-hook," control is transferred to box 390 of FIG. 3b.

In one embodiment of the present invention stores MT1.1, MT1.2, . . . MT1.n are assigned, for example, to terminal stations T1.1, T1.2, . . . T1.n, and, in accordance with the present invention, call charge information transmitted by a public exchange to PBX 100 via an exchange line is stored therein. In accordance with one aspect of the present invention, a program which controls control CC 110 and/or control CPU 210 of switching module SM 200, depending on the particular manner in which the embodiment is fabricated, is fabricated so that predetermined information which is stored in the aforementioned stores can be utilized to charge for service at rates which are higher than those charged for use of the public network in order to take into account the cost of using PBX 100. In a still further aspect of the present invention, PBX 100 keeps track of call charge on a real-time basis so that, for example, whenever a pre-determined call charge amount has been reached for terminal station T1, an indication thereof may be transmitted to terminal station T1 in the form, for example, of an identifiable tone or a predetermined voice or other type of message. In addition, depending on the type of terminals involved, after the indication is transmitted, PBX 100 can terminate the second connection to terminal station T2.

As indicated at box 390 of FIG. 3b, PBX 100, and in particular control CC 110 and/or control CPU 210, depending on the particular embodiment, generates a message such as, for example in the case where terminal station T1 is a telephone terminal station, to request the calling party at terminal station T1 to transmit the call number of a further called party telephone terminal station to which a connection is to be placed. Then, control is transferred to box 400 of FIG. 3b.

As indicated at box 400 of FIG. 3b, PBX 100, and in particular control CC 110, determines whether T1 has transmitted an acknowledgment to indicate that it will then transmit the calling number of a further called party telephone terminal station. The manner in which the acknowledgment is generated may be accomplished by any one of a number of methods which are well known to those of ordinary skill in the art such as, for example, by having the user transmit a predetermined sequence of signals from terminal station T1. If so the acknowledgment is received, control is transferred to box 410 of FIG. 3b, otherwise, control is transferred to box 440 of FIG. 3c.

As indicated at box 410 of FIG. 3b, the user utilizes terminal station T1 to transmit the calling number of a further called party terminal station Tx to PBX 100, which information is received by PBX 100. Then, control is transferred to box 420 of FIG. 3b.

As indicated at box 420 of FIG. 3b, PBX 100, by means of control CC 110, sets up a second connection between called party terminal station Tx and calling party terminal station T1. As was described above in conjunction with the discussion of box 380 of FIG. 3b, at the start of the second connection to calling party terminal station Tx, PBX 100 begins to register call charging information. Then, control is transferred to box 430 of FIG. 3b.

As indicated at box 430 of FIG. 3b, PBX 100 monitors the connection between T1 and Tx in a manner which is well known to those of ordinary skill in the art. If PBX 100 determines that the call between terminal station T1 and terminal station Tx has ended because, for example, T1 has gone "on-hook," control is transferred to box 440 of FIG. 3c. However, if the call between terminal station T1 and terminal station Tx has ended because Tx has gone "on-hook," control is transferred to box 390 of FIG. 3b.

As indicated at box 440 of FIG. 3c, PBX 100, and in particular control CC 110 and/or control CPU 210, depending on the particular embodiment, provides for appropriately authorized terminal stations such as, for example, terminal station T1, to be able to retrieve call charge information attributed to it from the store MT1.1. For example, in one embodiment of the present invention, this information is transmitted by PBX 100 directly to terminal station T1 in an appropriate format. Alternatively, PBX 100 can transmit the corresponding billing information to a previously designated terminal. Also, such call charge information may be transmitted to the appropriate terminal station upon termination of the second connection.

It should be understood, that it is within the scope of the present invention that a communication can be transmitted from a first terminal station to a second terminal station in cases where the first and the second terminal station are not the same type of terminal stations. For example, in such a case, information may be transmitted from the first terminal station which is stored at storage module VM 250 of SM 200 after conversion from a form which is received from terminal station T1 to a form which may be received by terminal station T2. In particular, one specific example of this occurs whenever a voice message is transmitted from terminal station T1, the voice message may be transformed for example, in a manner which is well known to those of ordinary skill in the art, into a facsimile message and stored as such in VM 250. Then, the second connection to terminal station T2 will transmit the converted voice message to terminal station T2.

It is to be appreciated and understood that the specific embodiments of the invention described hereinbefore are merely illustrative of the general principles of the invention. Various modifications may be made by those skilled in the art consistent with the principles set forth hereinbefore.

For example, whenever the telecommunication terminal station used by the calling party transmits its own call number when making an outgoing connection, for example, as is done by an ISDN terminal station, and whenever the PBX can receive such information, for example, whenever the PBX is an ISDN installation, it is unnecessary for the calling party to supply terminal-station-specific right-of-access information. In this case, the PBX may verify the right of access to the connection service by checking the transmitted terminal station's telephone call number.

In a further example, the PBX will make an attempt to provide a connection to a called party telecommunication terminal station at a time determined by input received from the calling party through the calling party's telecommunication terminal station. In addition, in accordance with a further aspect of the present invention, in the case of an unsuccessful connection attempt, in response to predetermined stored information or in response to corresponding additional information received from the calling party through the calling party's telecommunication terminal station, the PBX will make a number of attempts to set up a connection. As one can readily appreciate, this aspect of the present invention is particularly advantageous when, at the time of the first connection attempt, at least one of the two terminal stations that are to be connected is not ready for connection.

In a still further example, a communication may be sent from a calling party's terminal station to a called party's terminal station, without the calling party's terminal station being included in the telecommunication connection between the PBX and the called party's terminal station.

A second embodiment of the method of the present invention will now be described in detail with reference to the flow diagram shown in FIGS. 5a–5b. In the second embodiment of the method of the present invention, calling party terminal station T1 transmits both its own calling telephone number and the calling number of called party T3 during the first connection to PBX 100. Then, the procedures that follow until termination of the first connection between terminal station T1 and PBX 100 as shown in FIG. 5a are substantially the same as those shown in FIG. 3a for the first embodiment.

In the next step of the second embodiment of the present invention, PBX 100 calls the desired called party T3. If the called party does not answer, the call may be repeated a predetermined number of times until T3 answers. If the called party terminal station T3 answers and, if this is an external terminal station with respect to PBX 100, PBX 100 registers the billing information from the exchange line to the public network and initiates automatic billing in accordance with the billing information. This billing information is stored in billing information store MT.1 assigned to calling party terminal station T1. Following the connection to T3, PBX 100 calls calling party terminal station T1. If, terminal station T1 does not answer, control CC 110 of PBX 100 generates a message which indicates that the connection between T1 and T3 was not set up and transmits this message to terminal station T3. Then, the connection between PBX 100 and terminal station T3 is broken. If, on the other hand, calling party station T1 answers, PBX 100 sets up a connection between terminal station T1 and T3.

Figure 5A:
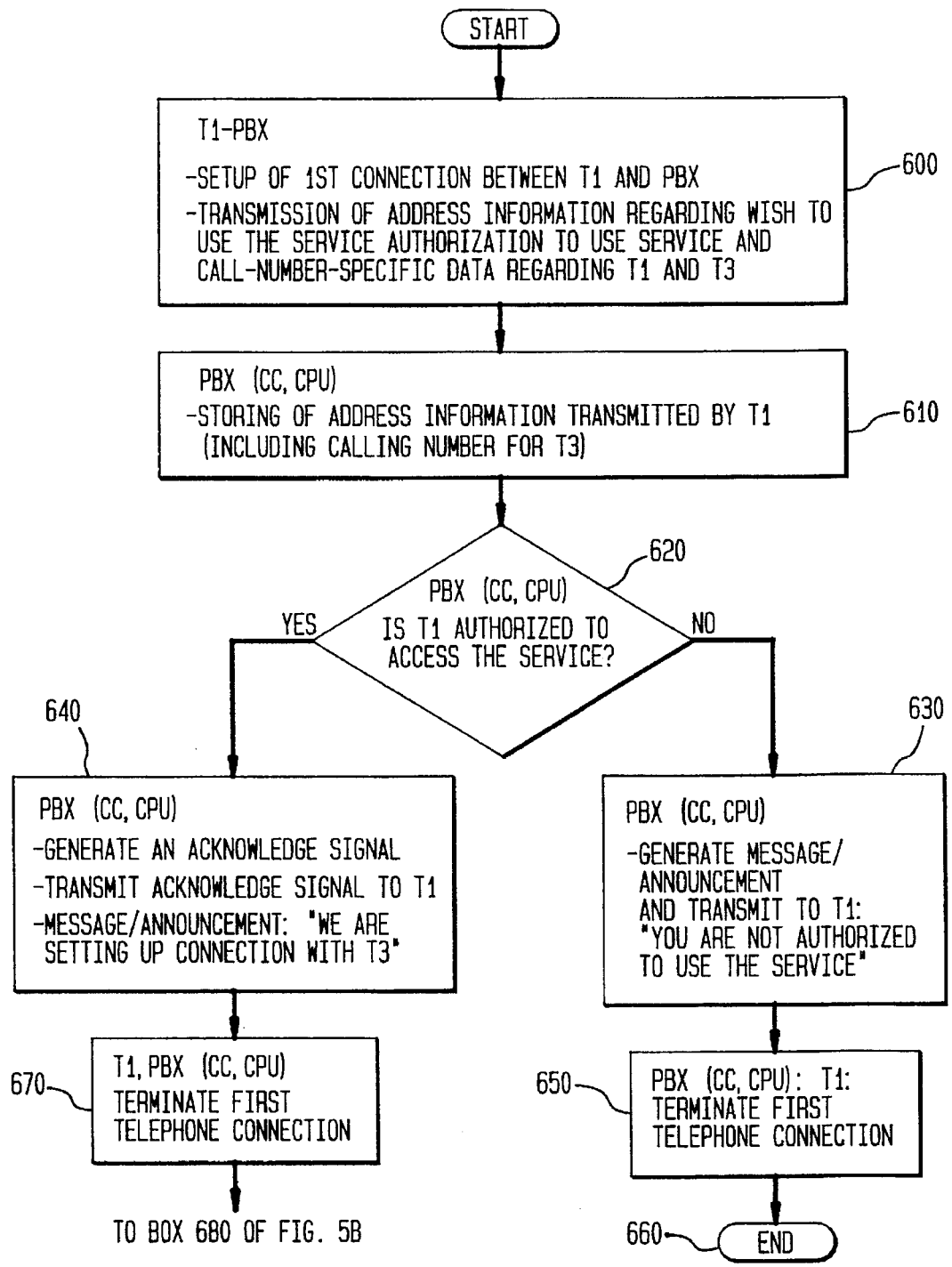
FIGS. 5a to 5b show a flow diagram of a second embodiment of the method of the present invention.

As indicated at box 600 of FIG. 5a, a calling party utilizes external telecommunication terminal station T1 to set up a connection to PBX 100 via a public network (not shown). Then, the calling party transmits additional information to PBX 100 which is utilized in requesting the service provided by embodiments of the present information. The additional information may be transmitted utilizing telecommunication terminal station T1 or it may be transmitted by another device which utilizes the connection set up between T1 and PBX 100. As such, telecommunications terminal station T1 transmits additional information regarding the calling party's request to use the service provided by the method of the present invention and possibly user-specific or terminal-station-specific information which may be utilized to determine whether this service may be provided to telecommunications terminal station T1 and/or to the particular calling party who is using telecommunications terminal station T1. Further, the additional information includes called party-specific data. For example, such called party-specific data may include information which may utilized by PBX to set up a connection to the called party at, for example, called party telecommunications terminal station T3. It is within the scope of the present invention that this information may identify a called party by, for example and without limitation, telephone number or called party identifier such as name. The additional information is interpreted in cooperation with signaling unit SIU 170. In a first embodiment wherein a second connection must be set up to the calling party terminal T1, calling party terminal T1 transmits its own calling number during the first connection. However, in a system which utilizes ISDN, the calling number is transmitted automatically so that manual input of the calling number digits into terminal station T1 and detection of corresponding voice frequency signals in accordance with a multifrequency process by SIU 170 is not required. Then, after the additional information has been transmitted from telecommunication terminal station T1 to PBX 100, preferably, PBX 100 sends a signal to terminal station T1 which acknowledges receipt of the information. Then, control is transferred to box 610 of FIG. 5a.

As indicated at box 610 of FIG. 3a, PBX 100 temporarily stores the additional information which was transmitted thereto from terminal station T1, which additional information is utilized, among other things, to check the right of the calling party and/or terminal station T1 to use the service provided by the method of the present invention. As indicated in box 610 of FIG. 5a, PBX 100, and in particular control CC 110 and/or control CPU 210, depending on the particular embodiment, perform this storage function. Then, control is transferred to the portion of the method illustrated by decision box 620 of FIG. 5a.

As indicated at decision box 620 of FIG. 5a, PBX 100, and in particular control CC 110 and/or control CPU 210, depending on the particular embodiment, determines whether the calling party and/or terminal station T1 is authorized to use the service provided by the method of the present invention. This determination is made by accessing information stored in CMEM 193 and/or RAM 230, depending on the particular embodiment. In particular, a determination is made on the basis of the transmitted and, optionally, previously stored additional information, as to whether or not the first terminal station T1 and/or the user is authorized to use the service. This check is preferably made as soon as possible during the process of the first connection. The advantage of this has been discussed above. As shown in FIG. 5a, if station T1, for example, is authorized to utilize the service, control is transferred to box 640 of FIG. 5a, otherwise, control is transferred to box 630 of FIG. 5a.

As indicated at box 630 of FIG. 5a, PBX 100, and in particular control CC 110 and/or control CPU 210, depending on the particular embodiment, generates a message such as, for example for use where terminal station T1 is a telephone terminal station, "You are not authorized to use the service" and transmits the message to terminal station T1. Those of ordinary skill in the art should readily understand that the present invention is not limited to the situation where terminal station T1 is a telephone terminal station and further includes cases where other types of terminal stations such as facsimile machines, personal computers and so forth are used. Then, control is transferred to box 650 and 660 of FIG. 5a whereby the first connection is terminated by PBX 100.

As indicated at box 640 of FIG. 5a, the right-to-access check, within the framework of the first connection, indicates, for example, that T1 is authorized to use the service. Then, PBX 100, and in particular control CC 110 and/or control CPU 210, depending on the particular embodiment, generates an acknowledge signal and, optionally, an informative message which is further transmitted to calling party terminal station T1 such as, for example, "Please terminate the connection. We are setting up a connection to terminal station T2." Then, in one aspect of the inventive method, terminal station T1 terminates its connection with PBX 100 and control is transferred to the portion of the method illustrated by box 600 of FIG. 3a. In an alternative embodiment, instead of terminal station T1, PBX 100, and in particular control CC 110, terminates the connection between terminal station T1 and PBX 100. Then, control is transferred to box 670 of FIG. 5a.

As indicated at box 670 of FIG. 5a, PBX 100, in response to a signal from control CC 110 and/or control CPU 210, depending on the particular embodiment, terminates the first connection to terminal station T1. Then, control is transferred to box 680 of FIG. 5b.

Figure 5B:
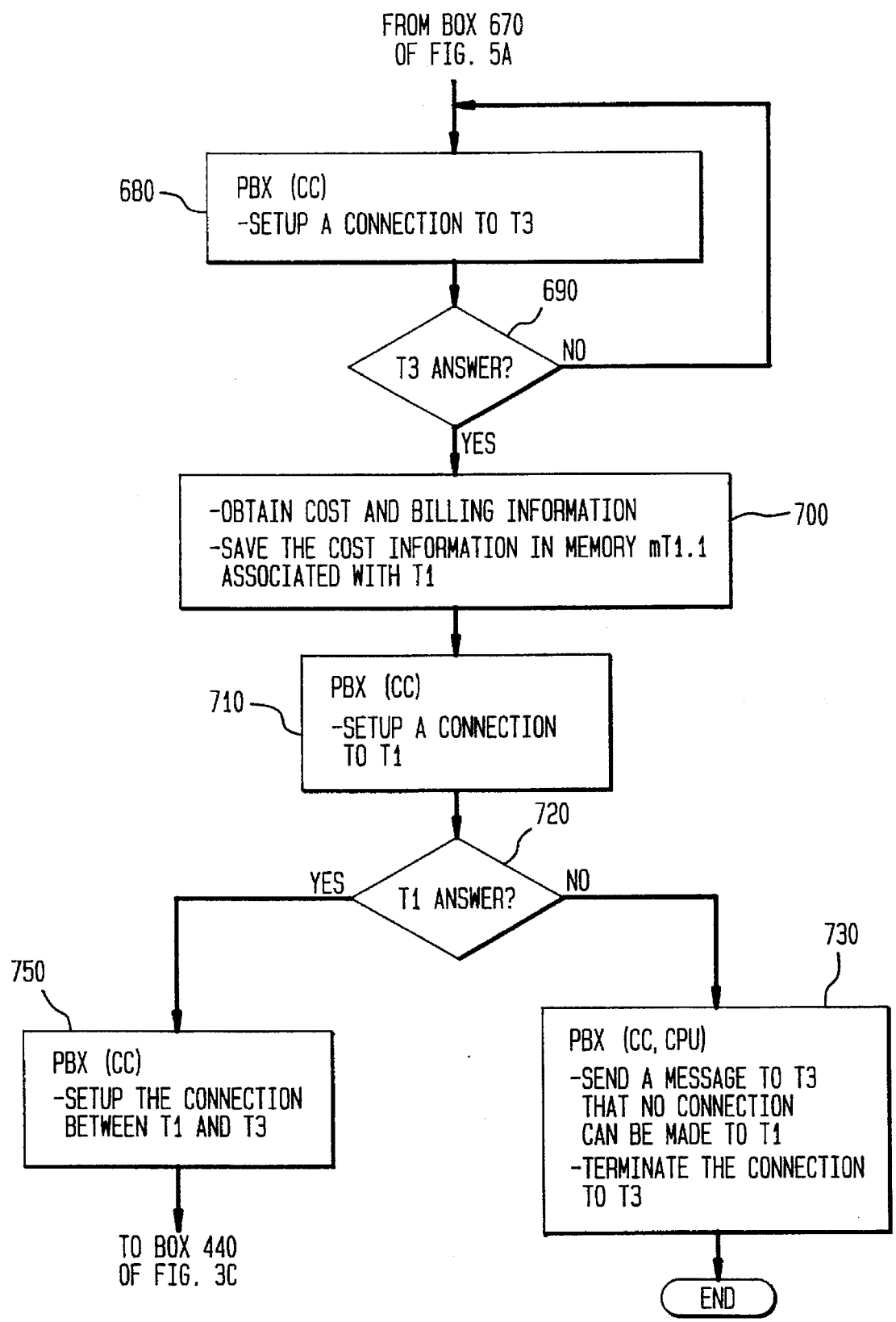

As indicated at box 680 of FIG. 5b, PBX 100, by means of control CC 110, attempts to set up a connection between PBX 100 and terminal station T3. Then, control is transferred to box 690 of FIG. 5b.

As indicated at box 690 of FIG. 5b, a determination is made by PBX 100 as to whether or not T3 answers. If T3 answers, control is transferred to box 700 of FIG. 5b, otherwise, control is transferred to box 680 of FIG. 5b to attempt to set up the connection to T3 again. The number of attempts to make to terminal station T3 can be a predetermined number which is stored in the system or it can be a part of the additional data which is transmitted from terminal station T1.

As indicated at box 700 of FIG. 5b, PBX 100 obtains billing information and saves the information in a memory such as memory MT1.1 associated with calling party terminal T1. Then, control is transferred to box 710 of FIG. 5b.

As indicated at box 710 of FIG. 5b, PBX 100, by means of control CC 110, attempts to set up a connection between PBX 100 and terminal station T1. Then, control is transferred to box 720 of FIG. 5b.

As indicated at box 720 of FIG. 5b, a determination is made by PBX 100 as to whether or not T1 answers. If T1 answers, control is transferred to box 750 of FIG. 5b, otherwise, control is transferred to box 730 of FIG. 5b.

As indicated at box 730 of FIG. 5b, PBX 100, and in particular control CC 110 and/or control CPU 210, depending on the particular embodiment, generates a message which is transmitted to called party terminal station T3 such as, for example, "No connection can be made to the calling party." Then, PBX 100, and in particular control CC 110, terminates the connection between terminal station T3 and PBX 100. Then, control is transferred to box 740 of FIG. 5b.

As indicated at box 750 of FIG. 5b, PBX 100, by means of control CC 110, sets up a connection between terminal station T1 and terminal station T3. Then, control is transferred to box 440 of FIG. 3c.

Further variations of the above-described embodiments are also within the scope and spirit of the present invention. For example, called parties may be identified by name by utilizing a database and the keypad of a typical touch tone telephone. Such a method is well known to those of ordinary skill in the are for entering called party identification by name.

Many changes, modifications, variations and other uses and applications of the subject invention will become apparent to those of skilled in the art after considering this specification and the accompanying drawings which disclose preferred embodiments thereof. For example, it is within the scope of the present invention that in one embodiment of the present invention, PBX 100 places a call to calling party terminal station T1 and provides a message whenever a connection cannot be completed to the called party, which message informs the calling party of this fact. As a further example, it is within the scope of the present invention that, in another embodiment of the present invention, the calling party at terminal station T1 can transmit, among the additional information, a message. PBX 100 stores this message, for example, in store VM 250. Then, when PBX 100 sets up a connection to the called party, PBX transmits this message to the called party. As a still further example, the second connection may be set up by first setting up a connection from the PBX to the calling party and then setting up a connection from the PBX to the called party. As those of ordinary skill in the art will readily appreciate, such an embodiment may be utilized to provide an informative message which can minimize the amount of time the calling and called party have to spend, for example, speaking to each other. All such changes, modifications, variations and other uses and applications which do not depart from the spirit and scope of the invention are deemed to be covered by the invention and the claims which follow.

What is claimed is:

1. A method for setting up a telecommunication connection via a public telecommunication network from a first telecommunication terminal station which is external to a private branch exchange, referred to as a PBX, which method comprises the steps of:

setting up a first connection between the first terminal station and the PBX;

during this first connection, transmitting information over the connection to the PBX;

determining whether the information contains predetermined data including a calling number for a second terminal station;

before attempting to call said second terminal station, terminating the first connection;

the PBX setting up a second connection to said second terminal station whose calling number was included in the information;

the PBX setting up a further connection to the first terminal station;

the PBX connecting the first terminal station and the second terminal station; and storing call charge information arising as a result of using the public telecommunications network during the connection between the first and second terminal stations, which call charge information is associated with the first terminal station.

2. The method of claim 1 which further comprises the steps of:

after the second terminal station has withdrawn from the second connection and while the another connection is active, transmitting additional information over the connection to the PBX; and the PBX setting up still another connection between the first terminal station and a further terminal station whose calling number was included in the additional information.

3. The method of claim 1 wherein:

the step of the PBX setting up the second connection comprises the PBX setting up the second connection to the second terminal station and, provided the second terminal station answers;

the step of the PBX setting up a further connection to the first terminal station comprises the PBX setting up the further connection to the first terminal station and, provided the first terminal station answers:

connecting the first terminal station and the second terminal station through the PBX.

4. The method of claim 1 wherein the step of determining whether the information contains predetermined data comprises the step of determining whether the predetermined data comprises predetermined user-specific and/or communication-specific authorization to authorize setting up the second connection.

5. The method of claim 1 wherein the information comprises information relating to a time at which the second connection is to be set up and wherein the step of the PBX setting up the second connection comprises the step of the PBX attempting to set up the second connection at or after the time.

6. The method of claim 1 wherein the information comprises information relating to a number of attempts which are to be made in setting up the second connection to the second terminal and wherein the step of the PBX setting up the second connection comprises the step of the PBX attempting to set up the second connection to the second terminal station is carried out for the number of times.

7. The method of claim 1 wherein the step of the PBX setting up the second connection comprises the steps of:

the PBX setting up a connection to the second terminal station and, provided the second terminal station does not answer;

the PBX setting up another connection to the first terminal station and, provided the first terminal station answers, transmitting a message to the first terminal station which provides information that the connection to the second terminal station was and/or could not be set up.

8. The method of claim 3 wherein the information comprises a message and wherein the step of the PBX setting up the second connection to the second terminal station and, provided the second terminal station answers, further comprises transmitting the message to the second terminal station.

9. A method of setting up a telecommunication connection from a first telecommunication terminal station which is internal or external to a private branch exchange, referred to as a PBX, which first PBX is connected via a public telecommunication network to a second PBX, which method comprises the steps of:

setting up a first connection between the first terminal station and the first PBX;

during this first connection, transmitting information over the connection to the first PBX;

transmitting at least some of the information from the first PBX to the second PBX via a data link connecting the first and second PBX;

determining whether the information contains predetermined data including a calling number for a second terminal station;

before attempting to call said second terminal station, terminating the first connection;

the second PBX setting up a second connection to said second terminal station whose calling number was included in the at least some of the information;

the second PBX setting up a further connection to the first terminal station, via the public telecommunications network;

the second PBX connecting the first terminal station and the second terminal station; and storing information relating to call charges arising as a result of using the public network during the connection between the first and second terminal stations at the second PBX, which call charge information is associated with the first terminal station.

10. The method of claim 9 which further includes the steps of:

after the connection between the first and second terminal stations is terminated, retrieving the stored call charging information associated with the first terminal station; and transmitting same to a predetermined apparatus.

11. The method of claim 9 wherein the step of storing information relating to call charges arising as a result of using the public network comprises the step of obtaining such information from the public network.

12. The method of claim 9 wherein the step of setting up the second connection comprises the step of attempting to set up the second connection at or after a predetermined time.

13. The method of claim 9 wherein the step of setting up the second connection comprises the step of attempting to set up the second connection to the second terminal station carried out for a predetermined number of times.

14. The method of claim 9 which further includes the steps of:

after the connection between the first and second terminal stations is terminated, retrieving the stored call charging information associated with the terminal station; and transmitting same to an apparatus identified in the information.

15. A method for setting up a telecommunication connection via a public telecommunication network from a first telecommunication terminal station which is external to a private branch exchange, referred to as a PBX, which method comprises the steps of:

setting up a first connection between the first terminal station and the PBX;

during this first connection, transmitting information over the connection to the PBX;

determining whether the information contains predetermined data including a calling number for a second terminal station;

before attempting to call said second terminal station, terminating the first connection;

the PBX setting up a further connection to the first terminal station;

the PBX making a second connection to a second terminal station whose calling number was included in the information;

the PBX connecting the first terminal station and the second terminal station; and storing call charge information arising as a result of using the public telecommunications network during the connection between the first and second terminal stations, which call charge information is associated with the first terminal station.

* * * * *